United States Patent
Itoh (10) Patent No.: US 8,185,266 B2
(45) Date of Patent: May 22, 2012

(54) FUEL SAVING DRIVING ASSISTANCE APPARATUS

(75) Inventor: Yasuyuki Itoh, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 12/656,734

(22) Filed: Feb. 16, 2010

(65) Prior Publication Data

US 2010/0235038 A1 Sep. 16, 2010

(30) Foreign Application Priority Data

Mar. 11, 2009 (JP) ................................. 2009-58108

(51) Int. Cl.
G06F 7/00 (2006.01)
B60T 8/32 (2006.01)
(52) U.S. Cl. ...................... 701/31.1; 701/86; 180/335
(58) Field of Classification Search ............... 701/31.4, 701/34.4, 86, 93; 180/335
See application file for complete search history.

(56) References Cited

U.S. PATENT DOCUMENTS

| | | | |
|---|---|---|---|
| 2007/0213920 A1 | 9/2007 | Igarashi et al. | |
| 2008/0234876 A1 | 9/2008 | Harumoto et al. | |
| 2009/0234521 A1* | 9/2009 | Kumar et al. | 701/19 |
| 2010/0256835 A1* | 10/2010 | Mudalige | 701/2 |
| 2011/0125357 A1* | 5/2011 | Harumoto et al. | 701/22 |

FOREIGN PATENT DOCUMENTS

| | | |
|---|---|---|
| JP | A-07-279702 | 10/1995 |
| JP | A-2003-106182 | 4/2003 |
| JP | A-2005-201190 | 7/2005 |
| JP | A-2005-337229 | 12/2005 |
| JP | A-2006-299920 | 11/2006 |
| JP | A-2008-164389 | 7/2008 |
| JP | A-2009-8624 | 1/2009 |

* cited by examiner

Primary Examiner — Yonel Beaulieu
(74) Attorney, Agent, or Firm — Posz Law Group, PLC (57) ABSTRACT

It is determined whether a vehicle enters a halting state or a slow moving state. It is detected that an accelerator opening degree of the vehicle is zero during a deceleration duration up to the time to enter the halting state or the slow moving state. Further, an accelerator zero duration is calculated which is a duration for which the vehicle is in the halting state or the slow moving state while the accelerator opening degree is zero. Furthermore, an accelerator zero travel distance is calculated which the vehicle runs during the calculated accelerator zero duration. Based on the accelerator zero travel distance, it is determined whether the fuel saving driving operation is performed in traveling during the accelerator zero travel duration. Even in the state where the travel speed of the vehicle changes more than needs during inertia travel, the fuel saving driving operation is diagnosed appropriately.

17 Claims, 8 Drawing Sheets

FUEL SAVING DRIVING ASSISTANCE APPARATUS

CROSS REFERENCE TO RELATED APPLICATION

The present application is based on and incorporates herein by reference Japanese Patent Application No. 2009-58108 filed on Mar. 11, 2009.

FIELD OF THE INVENTION

The present invention relates to a technology which provides assistance for fuel saving driving operation.

BACKGROUND OF THE INVENTION

[Patent document 1] JP-2005-337229 A (US-2007/02139920 A1)

Generally, under the state where the speed of a vehicle comes to be some extent, the motion energy of the vehicle enables an inertial travel of the vehicle, without need of an accelerator being stepped on. This can typically reduce the fuel consumption.

Patent document 1 discloses a technology as follows. The above inertial travel is detected from the state where the accelerator opening degree is zero. The travel distance or travel duration of the vehicle under the inertial travel is then obtained. The ratio of the obtained travel distance or travel duration under the inertial travel is calculated with respect to the total travel distance or the total travel duration. The calculated ratio and the relevant advice are notified. Assistance or management is thus provided to the driver for the fuel saving driving operation.

Incidentally, the travel speed of the vehicle may needlessly change by repeated useless operations of the accelerator during the travel. In such cases, the speed accelerated by the useless operations of the accelerator eventually needs to be slowed down by the inertial travel. Although the travel distance under the inertial travel becomes long compared with that of the usual inertial travel, the energy loss arises at the time of the acceleration and deceleration. This poses a disadvantage to increase the amount of fuel consumption accordingly.

As explained above, the technology in Patent document 1 detects the inertial travel from the state in which the accelerator opening degree is zero; thus, it cannot provide an appropriate diagnosis for the fuel saving driving operation in the state where the travel speed of the vehicle changes more than needed during such an inertial travel.

SUMMARY OF THE INVENTION

The present invention is made in consideration of such a disadvantage. It is an object to provide a technology of diagnosing fuel saving driving operation appropriately, even in the state where the travel speed of the vehicle changes more than needed.

To achieve the above object, according to an example of the present invention, a fuel saving driving assistance apparatus for a vehicle is provided as follows. A travel state is determined as to whether the vehicle is in a halting state or in a slow moving state. An accelerator opening is determined as to whether an accelerator opening degree of an accelerator of the vehicle is zero. A driving operation is diagnosed as to whether a fuel saving driving operation is performed. Herein, when diagnosing, (i) a deceleration duration and an accelerator zero travel duration are calculated based on determination results by determining the travel state and determining the accelerator opening, the deceleration duration being up to a time when the halting state or the slow moving state is detected, the accelerator zero travel duration being a duration for which an accelerator opening degree is zero during the deceleration duration, (ii) an accelerator zero travel distance is calculated, the accelerator zero travel distance being traveled during the calculated accelerator zero travel duration, and (iii) it is determined whether a fuel saving driving operation with respect to a driving operation during the accelerator zero travel duration is performed, based on the calculated accelerator zero travel distance.

It is noted that the halting state signifies the state where the speed of the vehicle is zero, while the slow moving state signifies the state where the vehicle can be stopped immediately, for instance, the speed of less than 10 km/hr or the moving distance of less than 1 meter after the brake is stepped on. In addition, the deceleration duration may signify a duration up to the time when the vehicle enters the halting state or the slow moving state; otherwise, the deceleration duration signifies a duration of the state, where the vehicle is being slowed down or a deceleration operation is being performed, so as to reach the halting state or the slow moving state.

Such a configuration can calculate the travel distance under the accelerator opening degree being zero during the deceleration duration up to the time when the vehicle enters the halting state or the slow moving state, thereby enabling the elimination of the travel distance under the accelerator opening degree being zero unfavorably resulting from the useless speed change.

Further, based on the calculated travel distance, the driving operation diagnosing means determines whether the fuel saving driving operation is performed in traveling during the travel duration. Even in the state where the travel speed of the vehicle changes more than needs during the traveling, the fuel saving driving operation is diagnosed appropriately.

According to another example of the present invention, a method is provided for diagnosing a fuel saving driving operation for a vehicle using a fuel saving driving assistance apparatus. The method comprises: (i) determining a travel state as to whether the vehicle is in a halting state or in a slow moving state; (ii) determining an accelerator opening as to whether an accelerator opening degree of an accelerator of the vehicle is zero; (iii) calculating, based on determination results by determining the travel state and determining the accelerator opening, (a) a deceleration duration up to a time when the halting state or the slow moving state is detected, and (b) an accelerator zero travel duration for which an accelerator opening degree is zero during the deceleration duration; (iv) calculating an accelerator zero travel distance during the calculated accelerator zero travel duration; and (v) determining whether a fuel saving driving operation with respect to a driving operation during the accelerator zero travel duration is performed based on the calculated accelerator zero travel distance.

Relating to the above example, as yet another example of the present invention, a program product is provided which is stored in a computer readable storage medium. The program product comprises instructions for execution by a computer, the instructions including the above-mentioned method, which is computer-implemented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, description will be given to an embodiment of the present invention with reference to the drawings.

First Embodiment

Hereinafter, description will be given to a first embodiment of the present invention with reference to the drawings. In addition, without being limited to the following explanation of the embodiment, the embodiment of the present invention can be achieved in various different manners.

[1. Explanation of Configuration of Fuel Saving Driving Assistance Apparatus 1]

Figure 1:
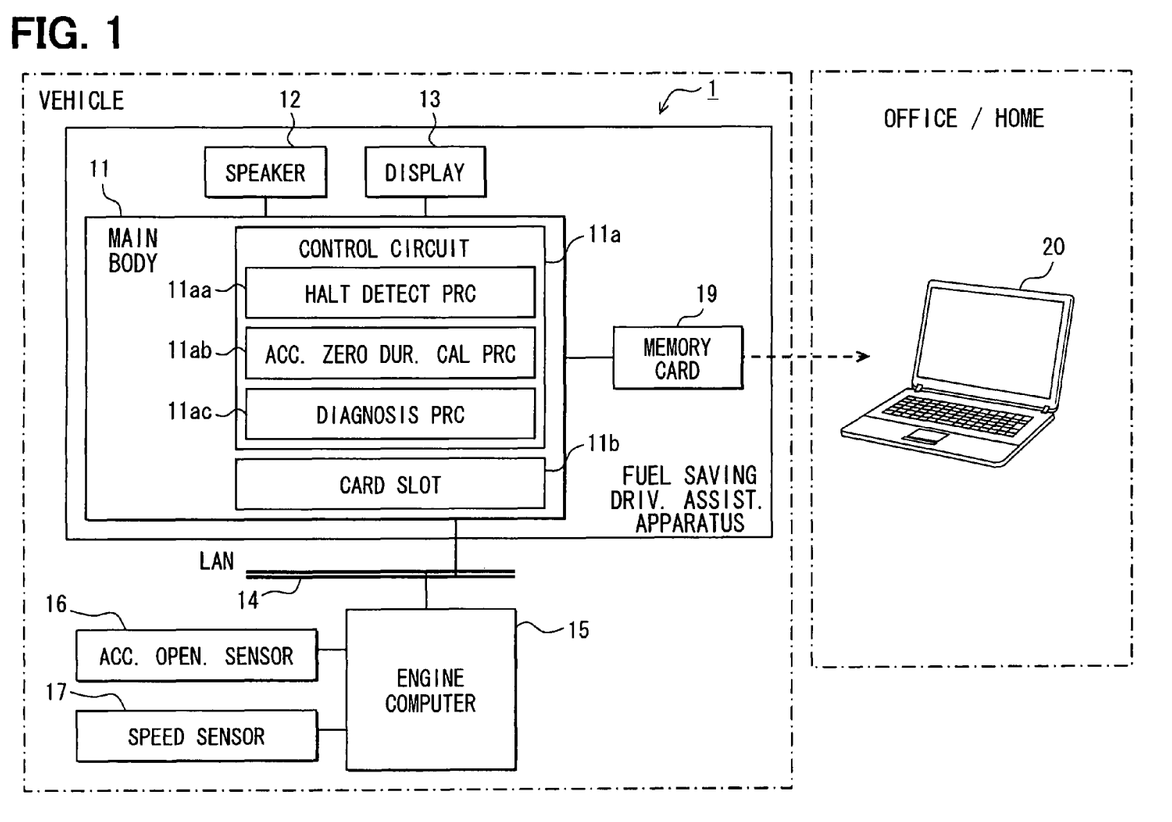
FIG. 1 is a schematic block diagram of a fuel saving driving assistance apparatus according to a first embodiment of the present invention.

As illustrated in FIG. 1, a fuel saving driving assistance apparatus 1 is mounted in a subject vehicle, and includes an in-vehicle apparatus main body 11, a speaker 12, and a display device 13.

The in-vehicle apparatus main body 11 includes a control circuit 11a and a card slot device 11b to which a memory card 19 is connected (or attached). The control circuit 11a is a commonly known device to mainly include a microcomputer equipped with CPU, ROM, RAM, etc., and controls each component or device of the configuration mentioned above. The control circuit 11a executes various processes according to a program read from the ROM or RAM. In addition, the control circuit 11a executes respective processes of a halting/slow moving state detection process 11aa, an accelerator opening zero duration calculation process 11ab, and a fuel saving driving diagnosis process 11ac, mentioned later.

The card slot device 11b is electrically connected with the memory card 19, thereby achieving data writing from the control circuit 11a to the memory card 19, and data reading-out from the memory card 19 to the control circuit 11a. The card slot device 11b has a configuration where the memory card 19 is detachable.

Furthermore, the memory card 19 contains a NAND flash memory as a nonvolatile memory the data of which can be electrically rewritable. When the memory card 19 is connected to a personal computer (PC) 20 at an office or home, a variety of information recorded can be inputted into the PC 20 for the use.

It is noted that other configuration of the in-vehicle apparatus main body 11 uses a well-known technology; therefore, a detailed explanation is omitted herein. The speaker 12 is installed in the vehicle compartment, and can output sounds such as audio guidance based on the result of the various processes in the in-vehicle apparatus main body 11.

The display device 13 is a color display screen and can be a liquid crystal display, an organic electroluminescence display, a CRT, or the like. The display device 13 can output displays or images of information based on the result of the various processes in the in-vehicle apparatus main body 11.

In addition, the in-vehicle apparatus main body 11 is connected via an interface (I/F) to the in-vehicle LAN 14 (unshown) mounted in the vehicle; it can obtain from an engine computer 15, which is similarly connected to the in-vehicle LAN 14, accelerator opening information which indicates a state of the accelerator opening degree, speed information which indicates a travel speed (vehicle speed) of the vehicle, and fuel consumption information which indicates a fuel consumption during minute time, etc.

Furthermore, the engine computer 15 calculates a fuel quantity (fuel consumption), which the vehicle consumes during minute time, from the fuel quantity (injection quantity) injected in a predetermined time to each cylinder of the engine of the vehicle. In addition, the engine computer 15 is connected with sensors such as an accelerator opening sensor 16 which acquires accelerator opening information, and a speed sensor 17 which acquires speed information, and acquires a variety of information from those sensors.

Furthermore, the control circuit 11a of the in-vehicle apparatus main body 11 can function as a travel state determining means or section, an accelerator opening determining means or section, and a driving operation diagnosing means or section. In addition, the control circuit 11a, the speaker 12, and the display device 13 can individually function as a notifying means or section.

[2. Explanation of Halting/Slow Moving State Detection Process]

Figure 2:
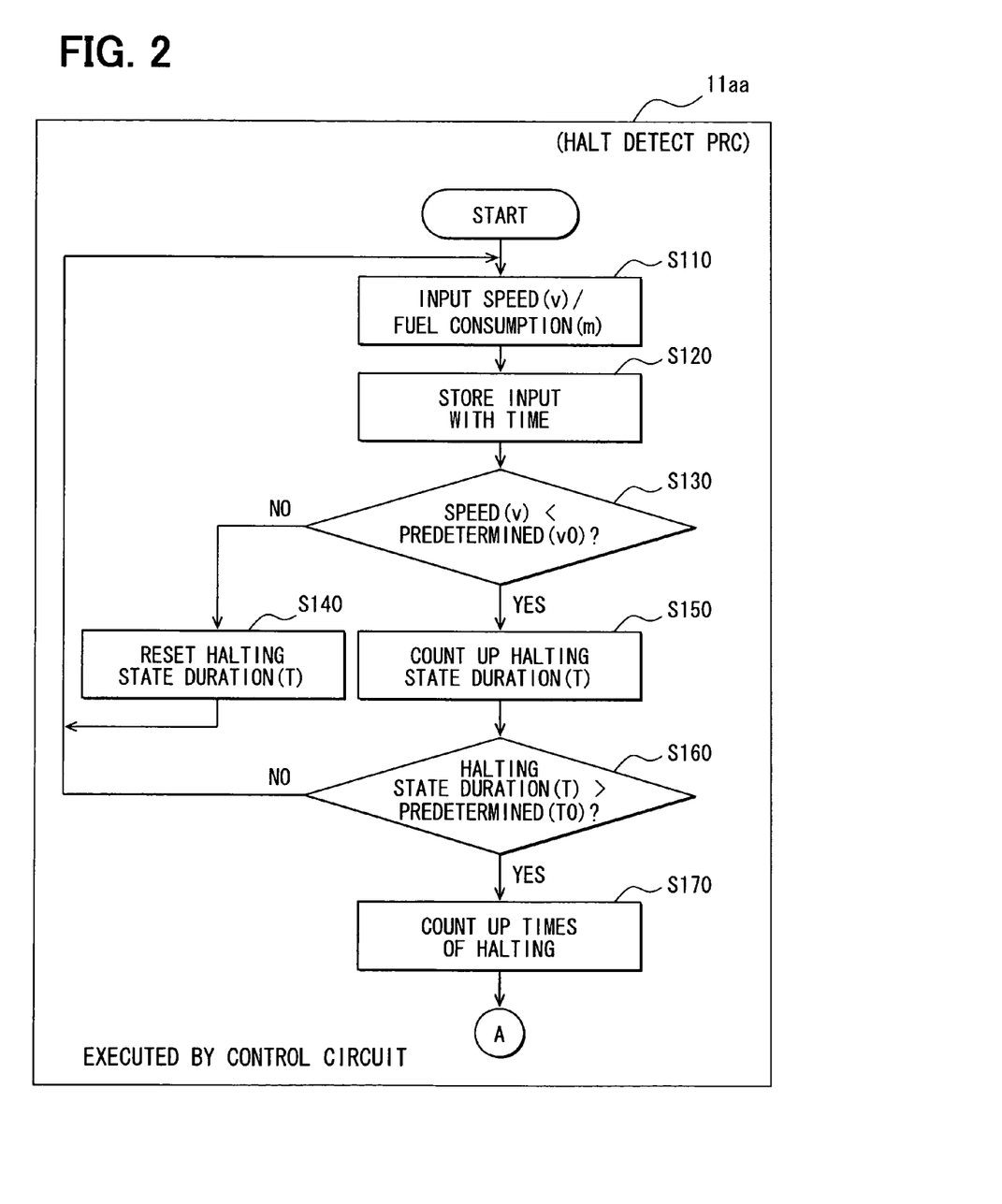
FIG. 2 is a flowchart illustrating a halting/slow moving state detection process.
Figure 4:
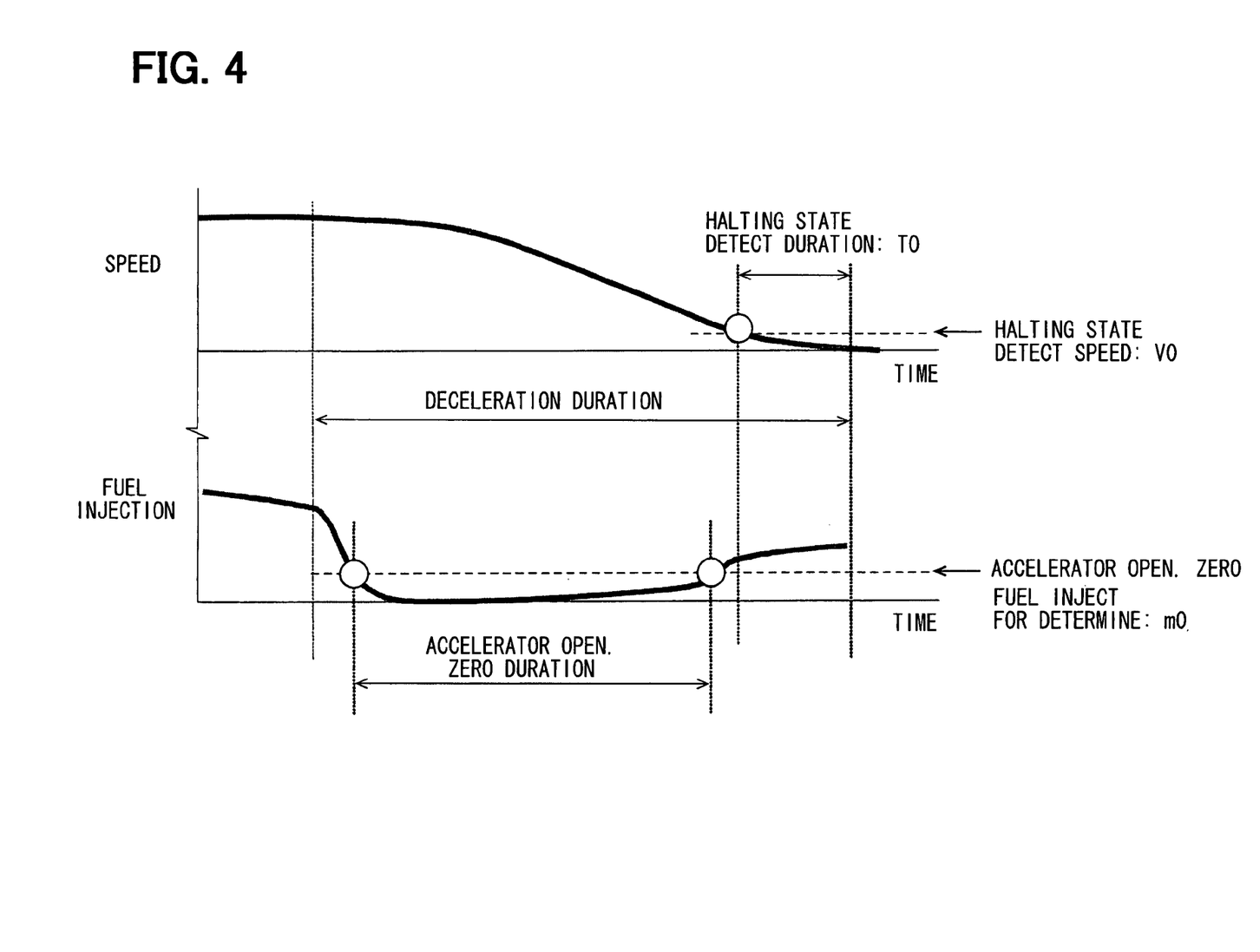
FIG. 4 is a diagram for explaining the halting/slow moving state detection process and the accelerator opening zero duration calculation process.

The following explains a halting/slow moving state detection process 11 as executed by the control circuit 11a of the in-vehicle apparatus main body 11 of the fuel saving driving assistance apparatus 1 with reference to flowcharts of FIG. 2, and FIG. 4.

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or unit and achieved not only as a software device but also as a hardware device.

The execution of the present process is started when the start of the engine of the vehicle is detected. At this time, the counters are reset which individually count a halting/slow moving state duration, the number of times of halting/slow moving states, and the number of times of nonarrival at reference value. In addition, the present process is ended when the engine stops.

It is noted that the halting state signifies the state where the speed of the vehicle is zero while the slow moving state signifies the state where the vehicle can be stopped immediately, for instance, the speed of less then 10 km/hr or the moving distance of less than 1 meter after the brake having stepped on. Furthermore, the halting/slow moving state duration indicates a counter value to count a duration for which the vehicle is either in the halting state or in the slow moving state. The halting/slow moving state duration is stored in the RAM in the control circuit 11a. Furthermore, the number of times of the halting/slow moving state indicates a counter value to count the number of times the vehicle is either in the halting state or in the slow moving state since the engine is started. The number of times of the halting/slow moving state is similarly stored in the RAM in the control circuit 11a. In addition, furthermore, the number of times of nonarrival at reference value is a counter value to count the number of times the fuel saving driving operation is not executed in the duration of the accelerator opening degree being zero while the speed of the vehicle is reduced. The number of times of nonarrival at reference value is similarly stored in the RAM in the control circuit 11a.

First, the speed information is acquired from the speed sensor 17 via the in-vehicle LAN 14 and the fuel consumption information is acquired from the engine computer 15 (S110). Then, the acquired speed information and fuel consumption information together with corresponding acquisition times are stored in the RAM in the control circuit 11a (S120). Furthermore, the above-mentioned acquisition time is designated from a present clock time indicated by a time counter built-in the in-vehicle apparatus main body 11.

Then, the determination is made as to whether or not the speed indicated by the acquired speed information is less than a predetermined speed (halting/slow moving state detection speed) (S130). When the determination at S130 is negated, the counter of the halting/slow moving state duration is reset (S140). In order to monitor the travel state of the vehicle succeedingly, the processing returns to S110.

In contrast, when the determination at S130 is affirmed (S130: YES), the counter of the halting/slow moving state duration is incremented (S150). Then, the determination is made as to whether or not the halting/slow moving state duration is greater than a predetermined duration (halting/slow moving state detection duration) (S160).

When the determination at S160 is negated, it does not come to determine that the vehicle is in the halting state or in the slow moving state. In order to monitor the travel state of the vehicle succeedingly, the processing returns to S110.

In contrast, when the determination at S160 is affirmed, it comes to determine that the vehicle is in the halting state or in the slow moving state. The counter of the number of times of halting/slow moving state is incremented or counted up (S170). Then, the present process is ended, thereby advancing to the next accelerator opening zero duration calculation process.

[3. Explanation of Accelerator Opening Zero Duration Calculation Process]

Figure 3A:
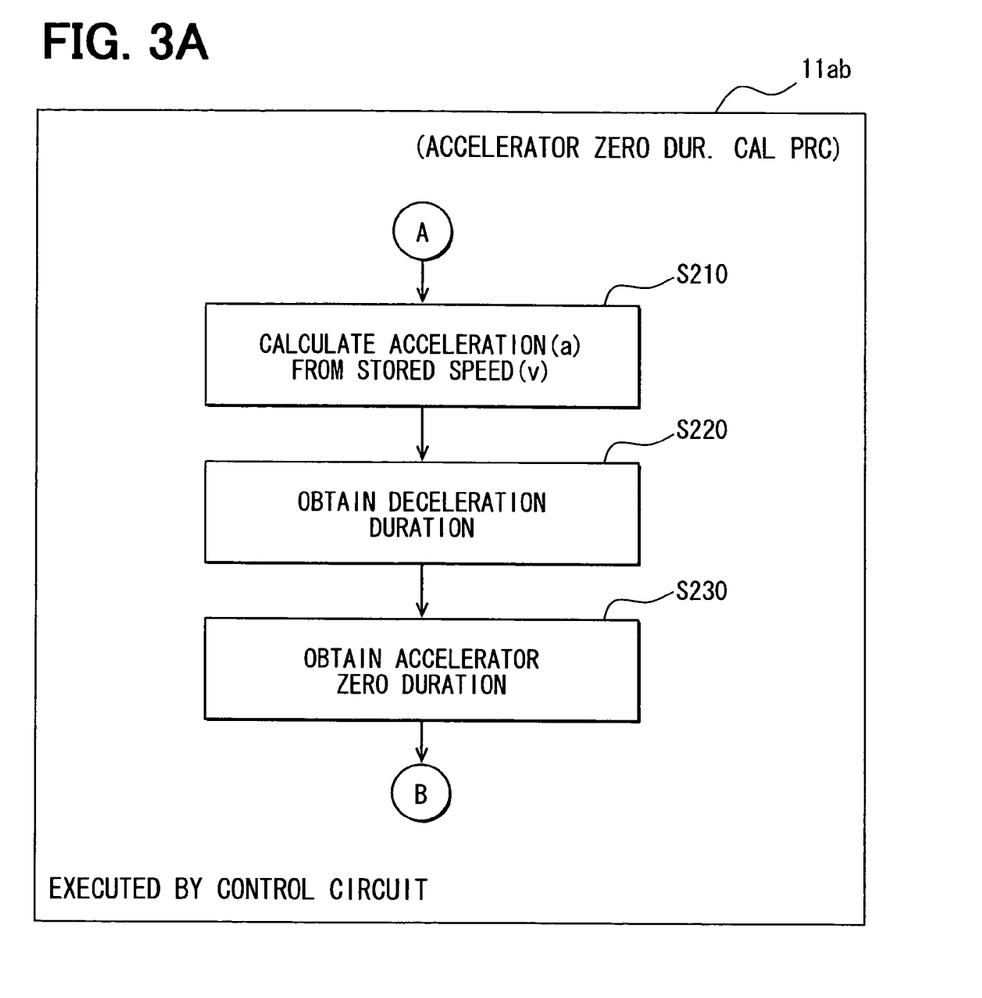
FIG. 3A is a flowchart illustrating an accelerator opening zero duration calculation process.

The following explains an accelerator opening zero duration calculation process executed by the control circuit 11a of the in-vehicle apparatus main body 11 of the fuel saving driving assistance apparatus 1 with reference to the flowchart of FIG. 3A and FIG. 4.

The present process is executed when the halting/slow moving state detection process is completed. First, an acceleration value of the vehicle is calculated from the speed information recorded in the RAM in the control circuit 11a (S210).

Then, a deceleration duration for which the vehicle has been slowed down is calculated (S220). It is noted that the deceleration duration is defined to signify a duration up to the time when the vehicle enters the halting state or the slow moving state. In addition, the deceleration duration can be defined to signify a duration in which the vehicle is in the decelerating state or in the deceleration operating state so as to enter the halting state or the slow moving state. In the present embodiment, the deceleration duration is calculated as the duration for which the calculated acceleration value is negative. The acceleration value may be positive from the road surface state etc. only just for minute time within a certain period of the acceleration value being negative. Such certain period can be regarded as the duration for which the acceleration value continues to be negative, without problems. Thus, in the present embodiment, when the acceleration value becomes positive only for predetermined minute time interleaved in the certain period for which the acceleration value is negative, such acceleration value being positive for minute time is amended by filtering such that the acceleration value continues to be negative during the certain period.

Then, the accelerator opening zero duration within the deceleration duration is calculated from the fuel consumption information recorded in the RAM in the control circuit 11a (S230). It is noted that when the fuel consumption quantity is less than a predetermined value (accelerator opening zero determination injection quantity), it is determined that the accelerator opening degree is zero. Alternatively, the accelerator opening information acquired from the engine computer 15 via the in-vehicle LAN may be used for determining whether the accelerator opening degree is zero.

Then, the present process is ended, thereby advancing to the following fuel saving driving diagnosis process.

[4. Explanation of Fuel Saving Driving Diagnosis Process]

Figure 3B:
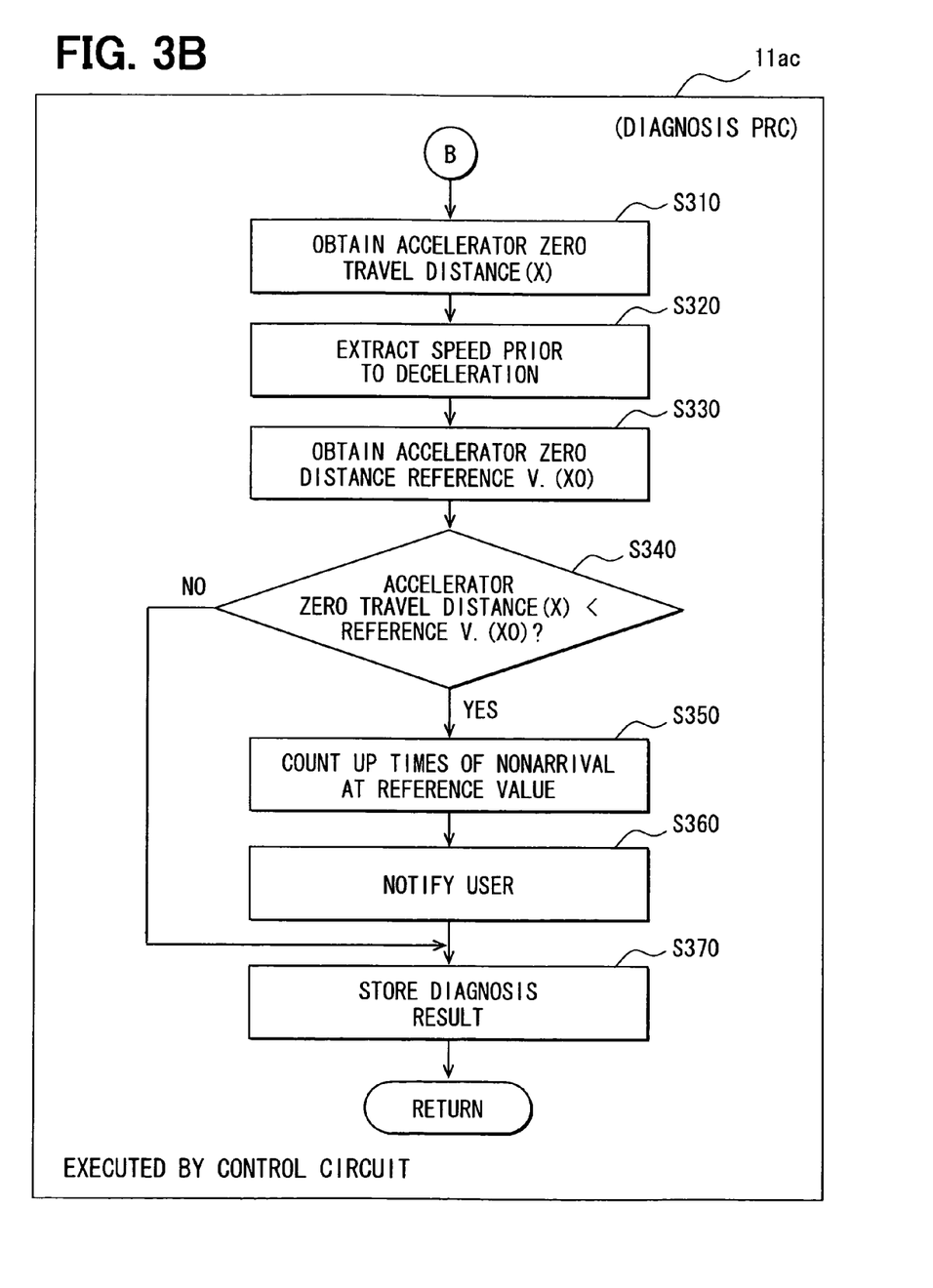
FIG. 3B is a flowchart diagram illustrating a fuel saving driving diagnosis process.

The following explains a fuel saving driving diagnosis process executed by the control circuit 11a of the in-vehicle apparatus main body 11 of the fuel saving driving assistance apparatus 1 with reference to the flowchart of FIG. 3B.

The present process is executed when the accelerator opening zero duration detection process is completed. First, an accelerator opening zero travel distance, which is traveled by the vehicle with the accelerator opening zero, is calculated from the speed information recorded in the RAM in the control circuit 11a (S310). It is noted that the accelerator opening zero travel distance is calculated by integrating the speed in the duration for which the accelerator opening degree has been zero.

Then, the speed prior to deceleration, which signifies a speed when the vehicle starts the deceleration, is extracted from the speed information recorded in the RAM in the control circuit 11a (S320). Then, with reference to the reference value map recorded in the RAM in the control circuit 11a, the reference value corresponding to the speed prior to deceleration is specified (S330).

It is noted that the reference value map is a map in which the reference value is associated with the speed prior to deceleration. For instance, the reference value is set to 500 m when the speed prior to deceleration is equal to or greater than 50 km/h. The reference value is set to 300 m when the speed prior to deceleration is ranging from 30 to 50 km/h. The reference value is set to 200 m when the speed prior to deceleration is less than 30 km/h. The setting of the reference value map can be previously determined through experiments etc.; otherwise, it can be set based on the user's operation.

Then, the determination is made as to whether the travel distance is less than the reference value (S340). When the determination at S340 is negated, the travel distance during the accelerator opening zero within the deceleration duration is determined to be sufficiently long when the speed prior to deceleration is taken into consideration. It is thus determined or diagnosed that the fuel saving driving operation was performed during the duration for which the accelerator opening degree is zero within the deceleration duration.

In contrast, when the determination at S340 is affirmed, the travel distance during the accelerator opening zero within the deceleration duration is determined to be not sufficiently long when the speed prior to deceleration is taken into consideration. It is thus determined or diagnosed that the fuel saving driving operation was not performed during the duration for which the accelerator opening degree is zero within the deceleration duration. In such cases, the counter of the number of times of nonarrival at reference value is incremented or counted up (S350). The message indicating that the fuel saving driving operation was not performed is outputted as an audio sound via the speaker 12 or as a display window image via the display device 13 to the driver (S360). The driver can thus reflect the determination result (diagnostic result) of the fuel saving driving operation on the driving operation shortly.

Then, the travel distance, the speed prior to deceleration, and the diagnostic result are recorded in the memory card 19 (S370). Furthermore, the number of times of halting/slow moving and the number of times of nonarrival at reference value may be included within the diagnostic result. It can be diagnosed that the fuel saving driving operation is performed more as the ratio of the number of times of nonarrival at reference value with respect to the number of times of halting/slow moving becomes small. When the above memory card 19 is connected to a personal computer (PC) 20 at an office or home, a variety of information recorded can be inputted into the PC 20 for the use. In addition, at the time of halting and parking of the vehicle, the variety of information recorded in the memory card 19 may be used via the fuel saving driving assistance apparatus 1. The processing then returns.

[5. Effect of First Embodiment]

(1) According to the fuel saving driving assistance apparatus 1 of the present first embodiment, the travel distance is calculated during the duration for which the accelerator opening degree continues to be zero in the deceleration duration up to the time when the vehicle enters the halting state or the slow moving state. In detail, the halting state or slow moving state of the vehicle is detected; then, the accelerator opening being zero is detected in the deceleration duration up to the time when the halting state or slow moving state is detected. The accelerator opening zero duration is calculated; then, the travel distance is calculated which the vehicle traveled during the calculated accelerator opening zero duration. Under such a configuration, the travel distance is calculated during the duration for which the accelerator opening degree continues to be zero in the deceleration duration up to the time when the vehicle enters the halting state or the slow moving state, thereby enabling the elimination of the travel distance under the accelerator opening degree being zero resulting from the useless speed change.

(2) Further, according to the fuel saving driving assistance apparatus 1 of the present first embodiment, it is determined that a fuel saving driving operation with respect to a driving operation during the travel duration was performed when the calculated travel distance is equal to or less than a reference distance value; in contrast, it is determined that a fuel saving driving operation with respect to a driving operation during the travel duration was not performed when the travel distance is greater than the reference distance value. It is noted that the above-mentioned reference value is changed depending on the vehicle speed at a start of the travel duration, with reference to a reference value map for setting up the reference value. Even in the state where the travel speed of the vehicle changes more than needs during the traveling, the fuel saving driving operation is diagnosed appropriately.

Second Embodiment

Hereinafter, description will be given to a second embodiment of the present invention with reference to the drawings.

Figure 5:
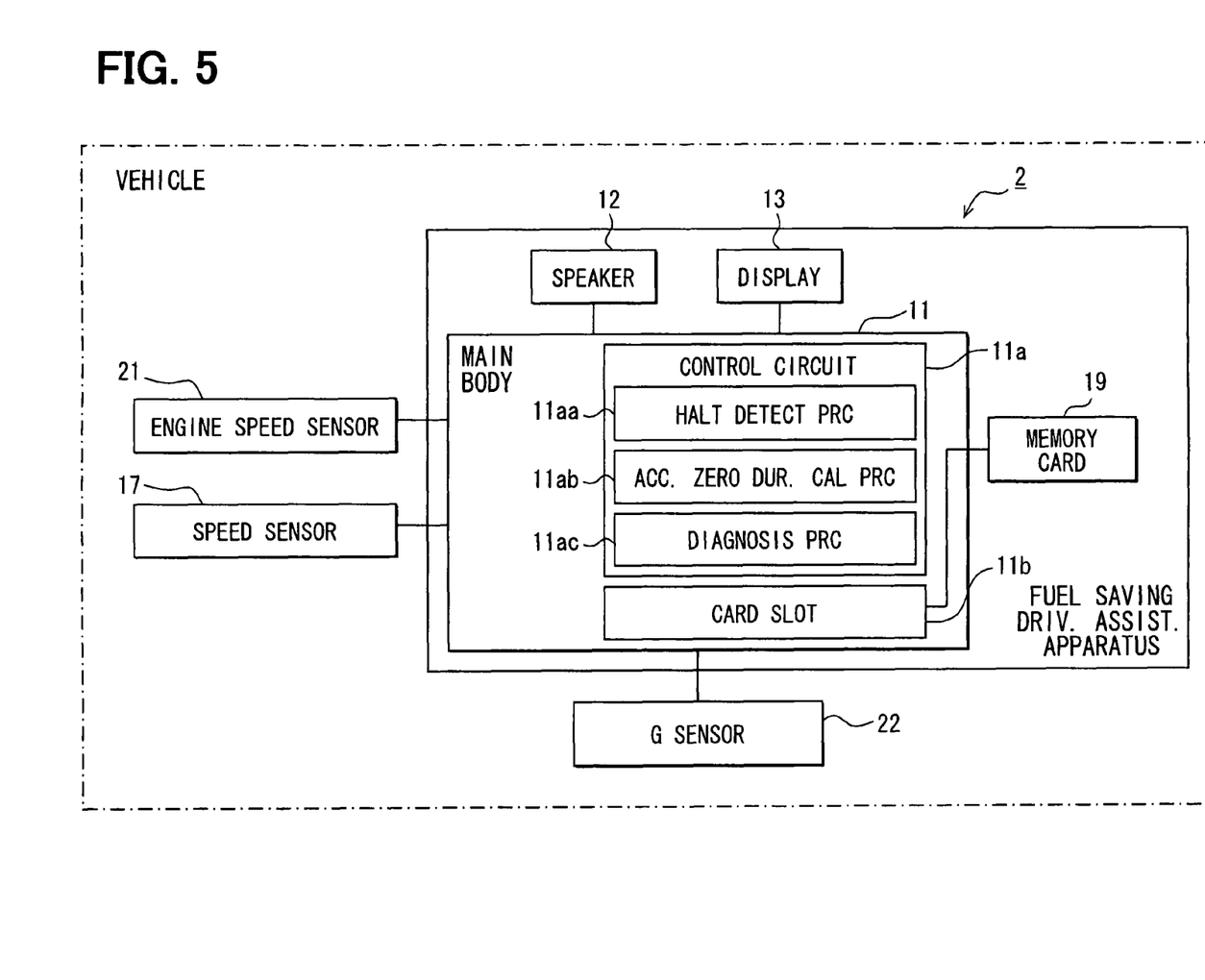
FIG. 5 is a schematic block diagram of a fuel saving driving assistance apparatus according to a second embodiment of the present invention.

In the fuel saving driving assistance apparatus 2 of the second embodiment, the in-vehicle apparatus main body 11 is connected to the various sensors; the information is acquired from the various sensors, without using the in-vehicle LAN 14.

[1. Explanation of Configuration of Fuel Saving Driving Assistance Apparatus 2]

The following explains a configuration of the fuel saving driving assistance apparatus 2 with reference to FIG. 5.

Furthermore, the following explains the second embodiment with respect to only portions different from the first embodiment. The in-vehicle apparatus main body 11 is connected via an interface (not illustrated) with an engine rotation sensor 21 to detect the number of rotations of the engine per predetermined time, a vehicle speed sensor 17, and a G sensor 22 to detect an acceleration in the forth and back direction (i.e., longitudinal direction) of the vehicle.

This allows the in-vehicle apparatus main body 11 to acquire (i) the information which indicates the number of rotations of the engine per predetermined time from the engine rotation sensor 21, (ii) speed information from the speed sensor 17, and (iii) the acceleration of the vehicle longitudinal direction from the G sensor 22.

[2. Explanation of Processes of Fuel Saving Driving Assistance Apparatus 2]

Next, the following explains the various processes executed by fuel saving driving assistance apparatus 2. Furthermore, the following explains the second embodiment with respect to only portions different from the first embodiment.

First, at S110 of the halting/slow moving state detection process 11aa, the control circuit 11a acquires the information which indicates the engine speed value from the engine rotation sensor 21 and the speed information from the speed sensor 17, without any intervening in-vehicle LAN, unlike the processing of the first embodiment.

In addition, at S170 of the halting/slow moving state detection process, when the road inclination is equal to or greater than a predetermined reference value, the counter of the number of times of halting and slow moving is not counted up, similarly unlike the first embodiment. This is because the inference of fuel injection is difficult in the foregoing case that fuel may be injected even in the deceleration state. Furthermore, in the present embodiment, the road inclination is calculated based on the output information from the G sensor 22.

In addition, at S220 of the accelerator opening zero duration calculation process, unlike the first embodiment, the deceleration duration for which the vehicle is slowed down or decelerated using the vehicle forth and back directional acceleration acquired from the G sensor 22.

Figure 6:
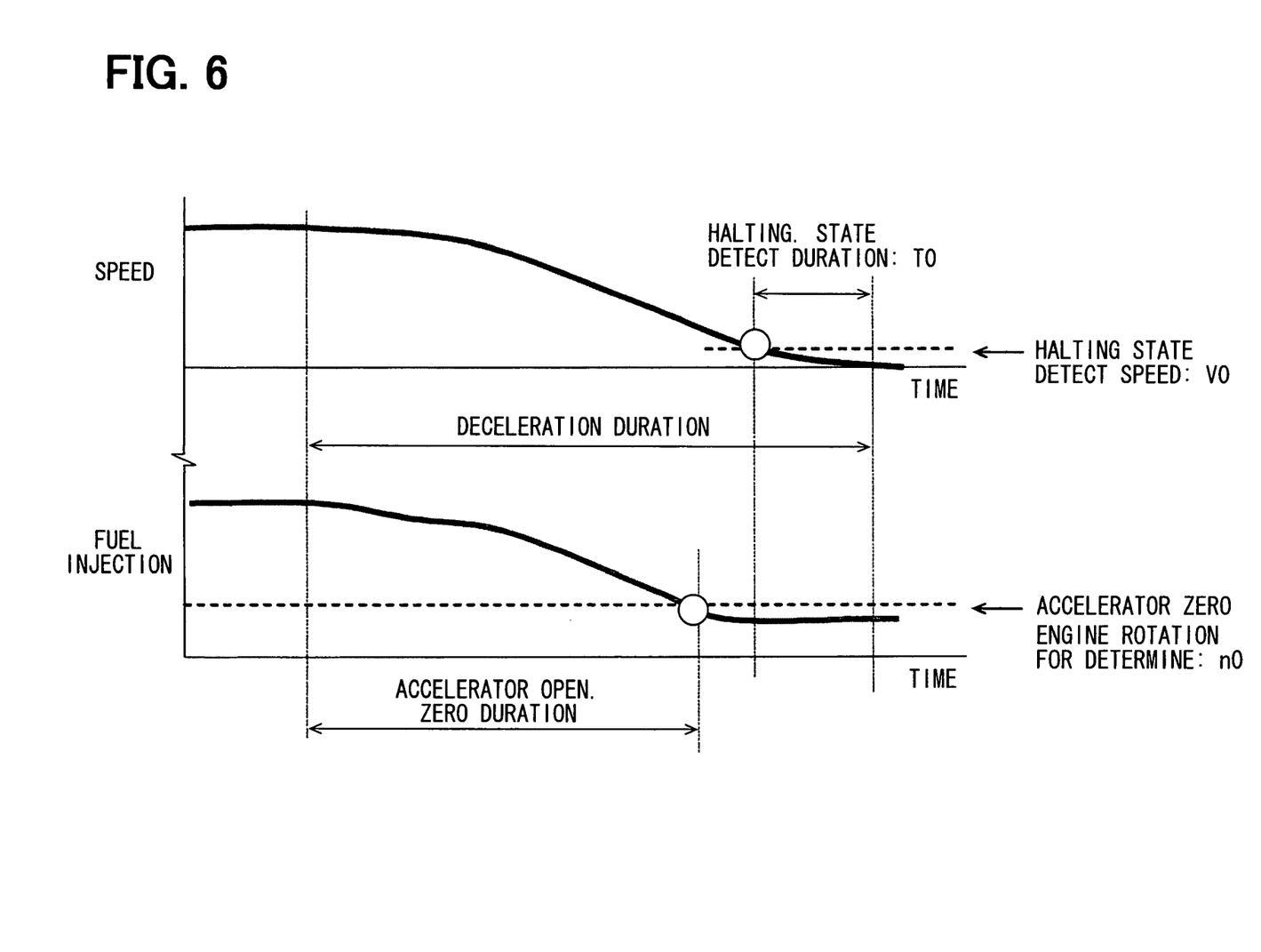
FIG. 6 is a diagram for explaining the halting/slow moving state detection process and the accelerator opening zero duration calculation process.

In addition, at S230 of the accelerator opening zero duration calculation process, similarly unlike the first embodiment, when calculating the accelerator opening zero duration within the deceleration duration, it is determined that the accelerator opening degree is zero when the engine speed value is less than a predetermined value (accelerator opening zero determination engine speed value) (refer to FIG. 6).

[3. Effect of Second Embodiment]

The fuel saving driving assistance apparatus 2 of the second embodiment can provide the same operational effect as the above first embodiment.

Third Embodiment

Hereinafter, description will be given to a third embodiment of the present invention with reference to the drawings.

Figure 7:
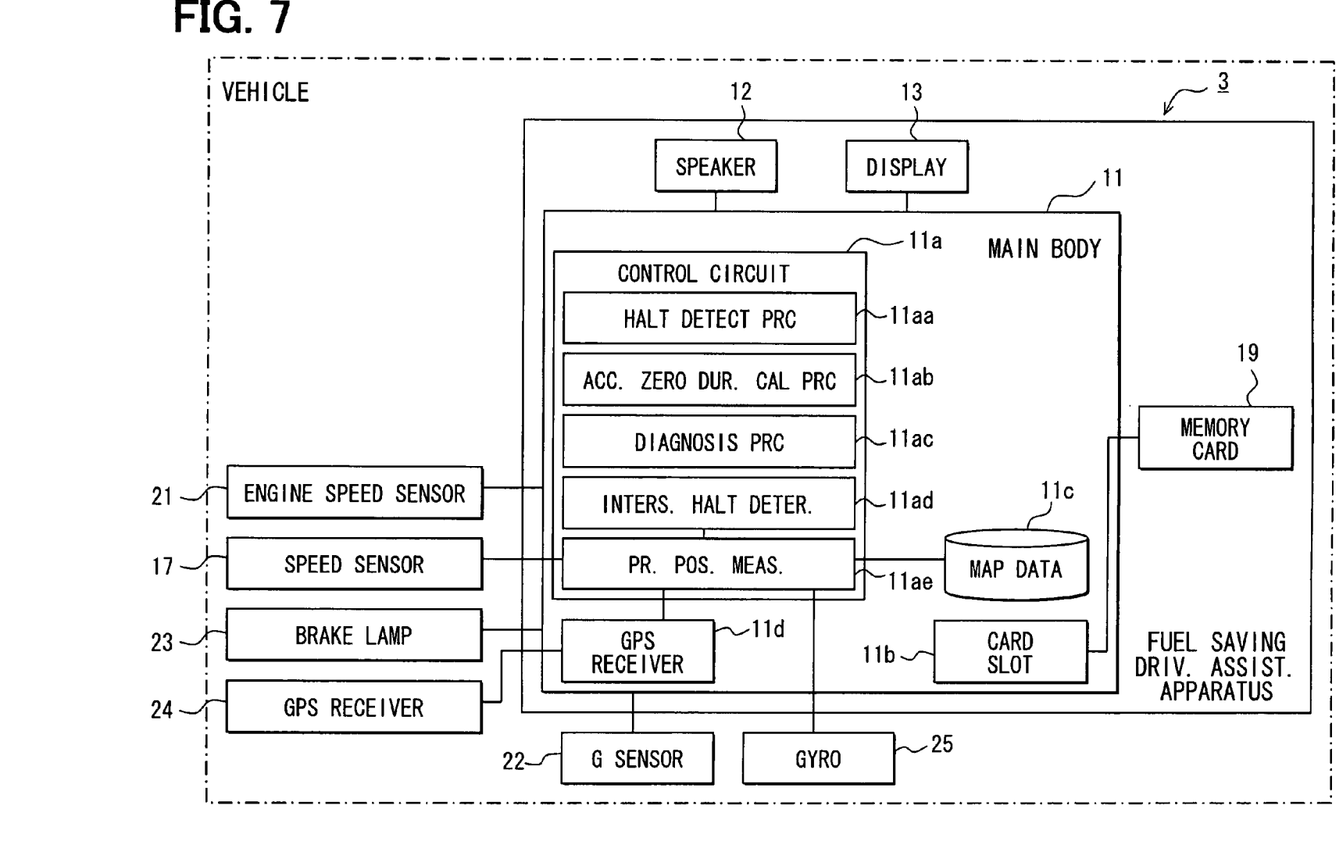
FIG. 7 is a schematic block diagram of a fuel saving driving assistance apparatus according to a third embodiment of the present invention.

The fuel saving driving assistance apparatus 3 of the third embodiment is characterized in that the in-vehicle apparatus main body 11 is connected with the various sensors to acquire the information from the various sensors, without any intermediating in-vehicle LAN 14, and includes a present position measurement function and an intersection halting/slow moving determining function.

[1. Explanation of Configuration of Fuel Saving Driving Assistance Apparatus 3]

The following explains a configuration of the fuel saving driving assistance apparatus 2 with reference to FIG. 7. Furthermore, the following explains the second embodiment with respect to only portions different from the first embodiment.

The in-vehicle apparatus main body 11 is provided with a map data storage device 11c storing map data and a GPS receiver 11d other than the above-mentioned control circuit 11a and the card slot device 11b. In addition, the in-vehicle apparatus main body 11 is connected via an interface (not illustrated) with an engine rotation sensor 21, a speed sensor 17, a brake lamp 23, a G sensor 22, and a gyroscope 25.

Such a configuration allows the in-vehicle apparatus main body 11 to acquire (i) the information which indicates the number of rotations of the engine per predetermined time from the engine rotation sensor 21, (ii) speed information from the speed sensor 17, (iii) information, which indicates that the brake of the vehicle is under operation, from the brake lamp 23, (iv) an acceleration of three axial directions of the vehicle from the G sensor 22, and (v) information, which indicates the horizontal angular velocity of the vehicle, from the gyroscope 25.

In addition, the in-vehicle apparatus main body 11 can acquire a GPS signal from the GPS antenna 24 via the GPS receiver 11d. Furthermore, the control circuit 11a has a present position measurement function 11ae which measures the present position of the vehicle, and an intersection halting/slow moving determining function 11ad which determines that the vehicle is under halting state or slow moving state at an intersection.

Furthermore, the present position measurement function is to measure a present position of the vehicle based on the speed, the horizontal angular velocity of the vehicle, the GPS information, and the map data. In addition, the intersection halting/slow moving determining function is to determine the halting state due to the traffic signal or the temporary halting sign at the intersection, or the slow moving state due to right or left turn at the intersection based on the present position of the vehicle obtained by the present position measurement function.

[2. Explanation of Processes of Fuel Saving Driving Assistance Apparatus 3]

Next, the following explains the various processes executed by fuel saving driving assistance apparatus 3. Furthermore, the following explains the third embodiment with respect to only portions different from the first embodiment.

First, at S110 of the halting/slow moving state detection process, the control circuit 11a acquires the information which indicates the engine speed value from the engine rotation sensor 21 and the speed information from the speed sensor 17, without any intervening in-vehicle LAN, unlike the processing of the first embodiment.

In addition, at S130 of the halting/slow moving state detection process, similarly unlike the first embodiment, when determining the intersection halting/slow moving determination function determines the halting state (stopping) of the vehicle at an intersection due to the traffic signals or the temporary halting sign, or the slow moving state (turning state) for turning to right/left at the intersection, the control circuit 11a determines that the vehicle is either in the halting state or in the slow moving state to thereby count up the counter of the halting/slow moving state duration.

In addition, at S170 of the halting/slow moving state detection process, when the road inclination is equal to or greater than a predetermined reference value, the counter of the number of times of halting and slow moving is not counted up. This is because the inference of the accelerator opening zero duration is difficult in the foregoing case that fuel may be injected even in the deceleration state. Furthermore, in the present embodiment, the road inclination is calculated based on the present position and map data of the vehicle.

In addition, at S220 of the accelerator opening zero duration calculation process, unlike the first embodiment, the deceleration duration for which the vehicle is slowed down or decelerated using the information indicating that the brake is under operation from the brake lump 23.

In addition, at S230 of the accelerator opening zero duration calculation process, similarly unlike the first embodiment, in calculating the accelerator opening zero duration during the deceleration duration, the control circuit 11a determines that the accelerator opening degree is zero when the number of rotations of the engine is less than a predetermined value (refer to FIG. 6).

[3. Effect of Third Embodiment]

The fuel saving driving assistance apparatus 3 of the third embodiment can provide the same operational effect as the above first embodiment.

As explained above, each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer. Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a fuel saving driving assistance apparatus for a vehicle is provided as follows. A means is provided for determining a travel state as to whether the vehicle is in a halting state or in a slow moving state. A means is provided for determining an accelerator opening as to whether an accelerator opening degree of an accelerator of the vehicle is zero. A means is provided for diagnosing a driving operation as to whether a fuel saving driving operation is performed. The driving operation diagnosing means is further configured to (i) calculate, based on determination results by the travel state determining means and the accelerator opening determining means, (a) a deceleration duration up to a time when the halting state or the slow moving state is detected and (b) an accelerator zero travel duration for which an accelerator opening degree is zero during the deceleration duration, (ii) calculate an accelerator zero travel distance during the calculated accelerator zero travel duration, and (iii) determine whether a fuel saving driving operation with respect to a driving operation during the accelerator, zero travel duration is performed based on the calculated accelerator zero travel distance.

Furthermore, the following techniques can be considered as a determination technique of the travel state of the vehicle. In the fuel saving driving assistance apparatus, the travel state determining means may be further configured to determine that the vehicle is in the halting state or in the slow moving state in cases that a vehicle speed corresponding to a travel speed of the vehicle is less than a predetermined speed value and an acceleration of the vehicle continues to be negative for a predetermined duration. Alternatively, the travel state determining means may be further configured to determine that the vehicle is in the halting state or in the slow moving state in cases that it is detected that the vehicle is halting or turning at an intersection based on a present position of the vehicle and map data. The travel state of the vehicle can be thus determined more appropriately.

Furthermore, the following techniques can be considered as a determination technique of the accelerator opening degree of the vehicle. In the fuel saving driving assistance apparatus, the accelerator opening determining means may be further configured to determine that the accelerator opening degree is zero in cases that a fuel quantity which the vehicle consumes in a predetermined time is less than a predetermined value. Alternatively, the accelerator opening determining means may be further configured to determine that the accelerator opening degree is zero in cases that a number of rotations per a predetermined time of an engine of the vehicle is less than a predetermined value. In addition, the information (accelerator opening degree information), which indicates the accelerator opening degree, is acquired from an engine computer via an in-vehicle LAN; it is possible to determine the above accelerator opening degree by using the acquired accelerator opening information. The accelerator opening degree of the vehicle can be thus determined more appropriately.

In addition, the following techniques can be considered as a determination technique which determines whether or not the fuel saving driving operation was executed. In the fuel saving driving assistance apparatus, the driving operation diagnosing means may be further configured to determine that a fuel saving driving operation with respect to a driving operation during the accelerator zero travel duration is performed when the accelerator zero travel distance is equal to or greater than a reference value, and determine that a fuel saving driving operation with respect to a driving operation during the accelerator zero travel duration is not performed when the accelerator zero travel distance is less than the reference value. Further, in the foregoing fuel saving driving assistance apparatus, the driving operation diagnosing means may be further configured to change the reference value depending on the vehicle speed at a start of the accelerator zero travel duration with reference to a reference value map, which sets up the reference value. Under such a configuration, the above-mentioned fuel saving driving operation can be determined more appropriately.

Furthermore, when the determination that the fuel saving driving operation was not executed is made, such determination or the contents of the determination can be notified a user. For example, a means may be further configured for providing a report indicating that a fuel saving driving with respect to a driving operation during the accelerator zero travel duration is not performed when the driving operation diagnosing means determines that a fuel saving driving operation with respect to a driving operation during the accelerator zero travel duration is not performed. The driver can thus promptly reflect the determination result of the fuel saving driving operation on the current driving operation.

As another aspect of the disclosure, a program product is provided which is stored in a computer readable storage medium. The program product comprises instructions for execution by a computer, the instructions including a computer-implemented method. The method comprises the following steps: (i) determining a travel state as to whether the vehicle is in a halting state or in a slow moving state; (ii) determining an accelerator opening as to whether an accelerator opening degree of an accelerator of the vehicle is zero; (iii) calculating, based on determination results by determining the travel state and determining the accelerator opening, (a) a deceleration duration up to a time when the halting state or the slow moving state is detected and (b) an accelerator zero travel duration for which an accelerator opening degree is zero during the deceleration duration; (iv) calculating an accelerator zero travel distance during the calculated accelerator zero travel duration; and (v) determining whether a fuel saving driving operation with respect to a driving operation during the accelerator zero travel duration is performed based on the calculated accelerator zero travel distance.

Such a program of the program product can be executed by the computer contained in a fuel saving driving assistance apparatus. Such a fuel saving driving assistance apparatus can provide the same operational effect as the above-mentioned fuel saving driving assistance apparatus. In addition, it is possible to distribute the program via a communications network or the like. Further, the substitution or replacement of the program in the fuel saving driving assistance apparatus is easy as compared with the substitution or replacement of the tangible article component parts. Therefore, the function of the fuel saving driving assistance apparatus can be also improved easily.

It will be obvious to those skilled in the art that various changes may be made in the above-described embodiments of the present invention. However, the scope of the present invention should be determined by the following claims.

What is claimed:

1. A fuel saving driving assistance apparatus for a vehicle, the apparatus comprising:
   a travel state determining section to determine a travel state as to whether the vehicle is in a halting state or in a slow moving state;
   an accelerator opening determining section to determine an accelerator opening as to whether an accelerator opening degree of an accelerator of the vehicle is zero; and
   a driving operation diagnosing section to diagnose a driving operation as to whether a fuel saving driving operation is performed,
   the driving operation diagnosing section being further configured to
      calculate, based on determination results by the travel state determining section and the accelerator opening determining section, an accelerator zero travel duration within a deceleration duration,
         the accelerator zero travel duration being a travel duration for which the vehicle travels in a state where the accelerator opening degree is zero,
         the deceleration duration being a duration up to a time when the vehicle becomes in the halting state or the slow moving state,
      calculate an accelerator zero travel distance, which is a travel distance traveled by the vehicle for the calculated accelerator zero travel duration, and
      determine, based on the calculated accelerator zero travel distance, whether a fuel saving driving operation was performed with respect to a driving operation during the accelerator zero travel duration.

2. The fuel saving driving assistance apparatus according to claim 1, wherein
   the travel state determining section is further configured to determine that the vehicle is in the halting state or in the slow moving state in cases that a vehicle speed corresponding to a travel speed of the vehicle is less than a predetermined speed value and an acceleration of the vehicle continues to be negative for a predetermined duration.

3. The fuel saving driving assistance apparatus according to claim 1, wherein
the travel state determining section is further configured to determine that the vehicle is in the halting state or in the slow moving state in cases that it is detected that the vehicle is halting or turning at an intersection based on a present position of the vehicle and map data.

4. The fuel saving driving assistance apparatus according to claim 1, wherein
the accelerator opening determining section is further configured to determine that the accelerator opening degree is zero in cases that a fuel quantity which the vehicle consumes in a predetermined time is less than a predetermined value.

5. The fuel saving driving assistance apparatus according to claim 1, wherein
the accelerator opening determining section is further configured to determine that the accelerator opening degree is zero in cases that a number of rotations per a predetermined time of an engine of the vehicle is less than a predetermined value.

6. The fuel saving driving assistance apparatus according to claim 1, wherein
the driving operation diagnosing section is further configured to
determine that the fuel saving driving operation was performed with respect to the driving operation during the accelerator zero travel duration when the accelerator zero travel distance is equal to or greater than a reference value, and
determine that the fuel saving driving operation was not performed with respect to the driving operation during the accelerator zero travel duration when the accelerator zero travel distance is less than the reference value.

7. The fuel saving driving assistance apparatus according to claim 6, wherein
the driving operation diagnosing section is further configured to change the reference value depending on the vehicle speed at a start of the accelerator zero travel duration with reference to a reference value map, which sets up the reference value.

8. The fuel saving driving assistance apparatus according to claim 1, further comprising:
a notifying section to provide a report when the driving operation diagnosing section determines that the fuel saving driving operation was not performed with respect to the driving operation during the accelerator zero travel duration,
the report indicating that the fuel saving driving was not performed with respect to the driving operation during the accelerator zero travel duration.

9. The fuel saving driving assistance apparatus according to claim 2, wherein
the accelerator opening determining section is further configured to determine that the accelerator opening degree is zero in cases that a fuel quantity which the vehicle consumes in a predetermined time is less than a predetermined value.

10. The fuel saving driving assistance apparatus according to claim 2, wherein
the accelerator opening determining section is further configured to determine that the accelerator opening degree is zero in cases that a number of rotations per a predetermined time of an engine of the vehicle is less than a predetermined value.

11. The fuel saving driving assistance apparatus according to claim 2,
the driving operation diagnosing section is further configured to
determine that the fuel saving driving operation was performed with respect to the driving operation during the accelerator zero travel duration when the accelerator zero travel distance is equal to or greater than a reference value, and
determine that the fuel saving driving operation was not performed with respect to the driving operation during the accelerator zero travel duration when the accelerator zero travel distance is less than the reference value.

12. The fuel saving driving assistance apparatus according to claim 11, wherein
the driving operation diagnosing section is further configured to change the reference value depending on the vehicle speed at a start of the accelerator zero travel duration with reference to a reference value map, which sets up the reference value.

13. The fuel saving driving assistance apparatus according to claim 3, wherein
the accelerator opening determining section is further configured to determine that the accelerator opening degree is zero in cases that a fuel quantity which the vehicle consumes in a predetermined time is less than a predetermined value.

14. The fuel saving driving assistance apparatus according to claim 3, wherein
the accelerator opening determining section is further configured to determine that the accelerator opening degree is zero in cases that a number of rotations per a predetermined time of an engine of the vehicle is less than a predetermined value.

15. The fuel saving driving assistance apparatus according to claim 3, wherein
the driving operation diagnosing section is further configured to
determine that the fuel saving driving operation was performed with respect to the driving operation during the accelerator zero travel duration when the accelerator zero travel distance is equal to or greater than a reference value, and
determine that the fuel saving driving operation was not performed with respect to the driving operation during the accelerator zero travel duration when the accelerator zero travel distance is less than the reference value.

16. The fuel saving driving assistance apparatus according to claim 15, wherein
the driving operation diagnosing section is further configured to change the reference value depending on the vehicle speed at a start of the accelerator zero travel duration with reference to a reference value map, which sets up the reference value.

17. A program product stored in a non-transitory computer readable storage medium comprising instructions for execution by a computer, the instructions including a computer-implemented method for a fuel saving driving assistance apparatus in a vehicle, the instructions for implementing the steps of:

determining a travel state as to whether the vehicle is in a halting state or in a slow moving state;

determining an accelerator opening as to whether an accelerator opening degree of an accelerator of the vehicle is zero;

calculating, based on determination results by the step of determining the travel state and the step of determining the accelerator opening, an accelerator zero travel duration within a deceleration duration, the accelerator zero travel duration being a travel duration for which the vehicle travels in a state where the accelerator opening degree is zero, the deceleration duration being a duration up to a time when the vehicle becomes in the halting state or the slow moving state;

calculating an accelerator zero travel distance, which is a travel distance traveled by the vehicle for the calculated accelerator zero travel duration; and determining, based on the calculated accelerator zero travel distance, whether a fuel saving driving operation was performed with respect to a driving operation during the accelerator zero travel duration.

* * * * *